United States Patent [19]

Kaplan et al.

[11] Patent Number: 5,710,221
[45] Date of Patent: Jan. 20, 1998

[54] THERMOSETTING, POWDER COATING SYSTEM

[75] Inventors: Andreas Kaplan, Chur; Albert Reich, Trin; Rene Gisler, Chur, all of Switzerland

[73] Assignee: EMS-Inventa AG, Zurich, Switzerland

[21] Appl. No.: 590,291

[22] Filed: Jan. 23, 1996

[30] Foreign Application Priority Data

Jul. 12, 1995 [DE] Germany .................. 195 25 437.6

[51] Int. Cl.$^6$ .................................. C08F 20/00
[52] U.S. Cl. ................. 525/438; 528/296; 528/300; 528/301; 528/302; 528/307; 528/308; 528/308.6; 525/437; 525/438; 524/81
[58] Field of Search ................. 528/296, 300, 528/301, 302, 307, 308, 308.6; 525/437, 438; 524/81

[56] References Cited

FOREIGN PATENT DOCUMENTS

| 0121260 | 3/1984 | European Pat. Off. . |
| 887543 | 1/1962 | United Kingdom . |
| 94/04589 | 3/1994 | WIPO . |
| 95/25762 | 9/1995 | WIPO . |

*Primary Examiner*—Samuel A. Acquah
*Attorney, Agent, or Firm*—Browdy and Neimark

[57] ABSTRACT

A method for producing glycidic ether-containing amorphous and/or semi-crystalline copolyesters involves first producing a hydroxyl-functional amorphous or semi-crystalline copolyester, and then converting such hydroxyl-functional copolyester with an epihaloalkane to form the desired glycidic ether-containing copolyester.

15 Claims, No Drawings

THERMOSETTING, POWDER COATING SYSTEM

The invention in particular relates to thermosetting powder systems, also called powder coatings, with group-containing amorphous and/or semi-crystalline copolyesters, suitable curing agents and/or pigments and/or fillers and/or additives, wherein the epoxi-de group-containing amorphous and/or semi-crystalline polyester was produced by a polymer analogous reaction of hydroxyl-functional copolyesters with epihaloalkanes. In the course of converting mono- or polyvalent monomeric monofunctional or polyfunctional aliphatic or aromatic alcohols with epihaloalkanes, monomeric glycidic ethers are obtained. These compounds are mainly employed as reactive diluents in epoxide coating systems. These epoxide coating systems contain glycidic ether on the basis of bisphenol A as binding agent. The production and use of the glycidic ethers and the epoxide resins on the basis of bisphenol A is known and described, for example, in the Handbook of Epoxy Resins by Lee and Neville, McGraw Hill Book Company, London, 1967.

Hydroxyl-functional copolyesters are a further group of materials having hydroxyl-functional groups and are widely known today.

It is therefore the object of the invention to make available thermosetting, powder coating systems on the basis of epoxide group-containing amorphous and/or semi-crystalline polyesters. It is furthermore intended to disclose a novel and simple process for producing the glycidyl-functional amorphous and/or semi-crystalline copolyesters.

The invention makes use of the surprising discovery that hydroxyl-functional amorphous and/or semi-crystalline copolyesters can be converted in a polymer-analogous reaction with epihaloalkanes and converted into epoxide group-containing copolyesters and therefore differentiated.

These special glycidic ether groups containing amorphous and/or semi-crystalline copolyesters are particularly suitable as binders for thermosetting powder coating systems.

Therefore thermosetting powder coating systems containing:

(A) at least one glycidic ether-containing amorphous and/or semi-crystalline copolyester, (B) an aliphatic and/or cycloaliphatic polybasic acid and/ or its anhydride and/or a polyol-modified anhydride of a polybasic acid and/or amorphous or semi-crystalline carboxylfunctional copolyester resins and/or carboxylfunctional acrylate resins, (C) if required, fillers and/or pigments and/or additives, are a subject of the instant invention, wherein the glycidic ether-containing amorphous and/or semi-crystalline copolyester has a molecular weight (Mn) of 300 to 10000 and can be obtained in that in a first step an amorphous and/or semi-crystalline copolyester (D) is produced containing hydroxyl groups, which subsequently is converted in further steps by the reaction with epihaloalkanes into an epoxide group-containing copolyester (A).

The amorphous and/or semi-crystalline copolyester (D) can be produced in accordance with condensation processes (esterification and/or transesterification) known for polyesters in accordance with the prior art. If necessary, it is also possible to use suitable catalysts, such as dibutyl stannic oxide or titanium tetrabutylate.

Suitable amorphous hydroxyl-functional copolyester resins have a hydroxyl number of 10 to 200 (mg KOH/g) and a glass transition temperature of >40° C. As acid components, amorphous hydroxyl-functional copolyesters mainly contain aromatic polybasic carboxylic acids, such as terephthalic acid, isophthalic acid, phthalic acid, pyromellitic acid, trimellitic acid, 3,6-dichlorophthalic acid, tetrachloro- phthalic acid and, to the extent available, their anhydrides, chlorides or esters. They mostly contain at least 50 mol % terephthalic acid and/or isophthalic acid, preferably 80 mol-%. The remainder of the acids (difference with 100 mol-%) consists of aliphatic and/or cycloaliphatic polybasic acids, such as 1,4-cyclohexane dicarboxylic acid, tetrahydrophthalic acid, hexahydroendomethylene terephthalic acid, hexachloro-phthalic acid, azelaic acid, sebacic acid, decane dicarboxylic acid, adipic acid, dodecane dicarboxylic acid, succinic acid, maleic acid and or dimeric fatty acids. Hydroxy-carboxylic acids and/or lactones, such as 12-hydroxy stearic acid, ε-caprolactone or hydroxy pivalic acid ester of neopentyl glycol, can also be used. Monocarboxylic acids, such as benzoic acid, tertiary butyl benzoic acid, hexahydro benzoic acid and saturated aliphatic monocarboxylic acids are also usable in small amounts.

Aliphatic diols should be mentioned as suitable alcohol components, such as ethylene glycol, 1,3-propanediol, 1,2-propanediol, 1,2-butanediol, 1,3-butanediol, 1,4-butanediol, 2,2-dimethyl propanediol-1,3 (neopentyl glycol), 2,5-hexanediol, 1,6-hexanediol, 2,2-[bis-(4-hydroxycyclo hexyl)]propane, 1,4-dimethylolcyclo hexane, diethylene glycol, dipropylene glycol and 2,2-bis-[4-(2-hydroxyl)] phenyl propane. Polyols are also usable in small amounts, such as glycerene, hexanetriol, pentaerythtriol, sorbitol, trimethylol ethane, trimethylol propane and tris(2-hydroxy) isocyanate. It is also possible to use epoxy compounds in place of diols or polyols. The proportion of neopentyl glycol and/or propylene glycol in the alcohol component preferably is at least 50 mol % in relation to the total acids.

Suitable semi-crystalline polyesters have a hydroxyl number of 10 to 400 (mg KOH/g) and an exactly defined DSC melting point. The semi-crystalline polyesters are condensation products from aliphatic polyols, preferably aliphatic diols, and aliphatic and/or cycloaliphatic and/or aromatic polybasic carboxylic acids, preferably dibasic acids. Examples of aliphatic polyols are: ethylene glycol (1,2-ethane diol), propylene glycol (1,3-propane diol), butylene glycol (1,4-butane diol), 1,6-hexane diol, neopentyl glycol, cyclohexane dimethanol, trimethylol propane, etc. Aliphatic diols are preferred, such as ethylene glycol, butylene glycol and 1,6-hexane diol.

Suitable polybasic carboxylic acids are aliphatic dicarboxylic acids, preferably $C_4$-$C_{20}$-dicarboxylic acids, such as adipic acid, azelaic acid, sebacic acid, dodecane dicarboxylic acid, succinic acid, undecane dicarboxylic acid, and aromatic dicarboxylic acids, such as terephthalic acid, isophthalic acid, phthalic acid and their hydration products, such as 1,4-cyclohexane dicarboxylic acid. Aliphatic dicarboxylic acids with 6 to 12 carbon atoms are preferred. It is of course also possible to employ mixtures of various polyols and polybasic carboxylic acids.

The reaction of the hydroxyl-functional amorphous and/ or crystalline copolyesters (D) with epihaloalkanes to from the epoxy group-containing copolyester (A) in accordance with the invention is performed in the manner customary for producing glycidic ethers.

The glycidic ether from hydroxyl-functional copolyesters is obtained in that the hydroxyl-functional amorphous and/or semi-crystalline copolyester is reacted with epihaloalkanes. As a rule, this reaction takes place in a two-stage process. In the first stage, epihaloalkane is added to the hydroxyl group of the polyester, in the course of which a polyhalohydrin ether is formed. This reaction is catalyzed by Lewis acids, such as boron (III) fluoride, tin (IV) chloride, etc.

Inert solvents, such as benzene, toluene, chloroform, etc. are suitable as solvents, or the operation is performed with a surplus of epihaloalkane, which is simultaneously used as a solvent.

The glycidic ether-containing amorphous and/or semi-crystalline copolyester is formed in the subsequent second stage by a dehydrohalogenization reaction in an inert solvent, e.g. toluene, with the use of an aqueous lye solution, e.g. a sodium hydroxide solution.

The salt solution and water resulting from this reaction, together with the water of the lye solution, form a specifically heavier aqueous waste liquor, which can be easily separated from the organic layer in a simple way after the conversion.

The reaction temperature in the first stage is approximately 80° C. with a reaction time of approximately 30 min. The reaction temperature in the second stage is 50° C. at a reaction time of approximately 60 min.

However, the conversion of the hydroxyl-functional amorphous and/or semi-crystalline copolyester can also take place in a one-stage reaction. This is a phase transfer-catalyzed two-phase reaction between the hydroxyl-functional amorphous and/or semi-crystalline copolyester, epihaloalkane and an aqueous solution, preferably a sodium hydroxide solution. Onium salts, especially quaternary ammonium and/or phosphonium compounds are employed as phase transfer catalysts, such as benzyl trimethyl ammonium bromide, tetramethyl ammonium bromide, benzyl trimethyl ammonium chloride, ethyl triphenyl phosphonium bromide and butyl triphenyl phosphonium chloride, wherein benzyl trimethyl ammonium bromide is preferred.

The reaction temperature of this stage is 60° C. at a reaction temperature of approximately 60 min.

The so-called azeotropic process is a variation of the phase transfer process, wherein the water which is present and is generated during the two phase reaction is distilled off azeotropically with the epihaloalkane in a vacuum.

1-chloro-2,3-epoxy propane (epichlorohydrin), 1-chloro-2-methyl-2,3-epoxy propane and 1-chloro-2,3-epoxy butane can be cited as examples of suitable epihalo-alkanes. 1-chloro-2,3-epoxy propane is preferred. Other epihaloalkanes can of course also be employed, such as epibromohydrin.

The molecular weights (Mn) of the epoxide group containing amorphous and/or semi-crystalline copolyesters are 300 to 10000. The epoxide number of the copolyesters in accordance with the invention containing epoxide groups lies in the range between 0.018 and 0.510 (equiv./100 g).

Aliphatic polybasic acids, preferably dibasic acids, such as adipic acid, pimelic acid, suberic acid, azelaic acid, sebacic acid, malonic acid, succinic acid, glutaric acid, 1,12-dodecane dioic acid, etc. can be used as the curing agents—components (B)—. The anhydrides of these acids can also be employed, for example glutaric acid anhydride, succinic acid anhydride, as well as the polyanhydrides of these dicarboxylic acids. The polyanhydrides are obtained by intermolecular condensation of the said aliphatic dibasic dicarbonic acids.

Examples are adipic acid (poly) anhydride, azelaic acid (poly) anhydride, sebacic acid (poly) anhydride, dodecane dioic acid (poly) anhydride, etc. The polyanhydrides have a molecular weight (average weight in relation to the polystyrene standard) of 1000 to 5000. The polyanhydrides can also be modified with polyol. The polyanhydrides can also be employed in a mixture with the aliphatic dibasic dicarboxylic acids, which have melting points between 40° and 150° C., for example 12-hydroxy stearic acid, 2- or 3- or 10-hydroxy octadecanic acid or 2-hydroxy myristicic acid.

Cycloaliphatic dicarboxylic acids, such as 1,4-cyclohexane dicarboxylic acid, or their polyanhydrides can also be employed as curing agents.

Amorphous and semi-crystalline carboxyl functional copolyesters are also suitable curing agents. The amorphous as well as the semi-crystalline copolyesters can be produced in accordance with condensations processes (esterification and/or transesterification) known for polyesters in accordance with the prior art. If necessary, it is also possible to use suitable catalysts, such as dibutyl stannic oxide or titanium tetrabutylate.

Suitable amorphous carboxyl-functional copolyester resins have a hydroxyl number of 10 to 200 (mg KOH/g) and a glass transition temperature of >40° C. As acid components, amorphous carboxyl-functional copolyesters mainly contain aromatic polybasic carboxylic acids, such as terephthalic acid, isophthalic acid, phthalic acid, pyromellitic acid, trimellitic acid, 3,6-dichlorophthalic acid, tetrachloro- phthalic acid and, to the extent available, their anhydrides, chlorides or esters. They mostly contain at least 50 mol % terephthalic acid and/or isophthalic acid, preferably 80 mol-%. The remainder of the acids (difference with 100 mol-%) consists of aliphatic and/or cycloaliphatic polybasic acids, such as 1,4-cyclohexane dicarboxylic acid, tetrahydrophthalic acid, hexahydroendomethylene terephthalic acid, hexachloro- phthalic acid, azelaic acid, sebacic acid, decane dicarboxylic acid, adipic acid, dodecane dicarboxylic acid, succinic acid, maleic acid and dimeric fatty acids, hydroxy-carboxylic acids and/or lactones, such as 12-hydroxy stearic acid, ε-caprolactone or hydroxy pivalic acid ester of neopentyl glycol, can also be used. Monocarboxylic acids, such as benzoic acid, tertiary butyl benzoic acid, hexahydro benzoic acid and saturated aliphatic monocarboxylic acids are also usable in small amounts.

In a preferred form the copolyester contains 0 to 95 mol.-% of cyclohexane dicarboxylic acid and 95 to 0 mol.-% of isophthalic acid combined with neopentylglycole.

Aliphatic diols should be mentioned as suitable alcohol components, such as ethylene glycol, 1,3-propanediol, 1,2-propanediol, 1,2-butanediol, 1,3-butanediol, 1,4-butanediol, 2,2-dimethyl propanediol-1,3 (neopentyl glycol), 2,5-hexanediol, 1,6-hexanediol, 2,2-[bis-(4-hydroxycyclo hexyl)]propane, 1,4-dimethylolcyclo hexane, diethylene glycol, dipropylene glycol and 2,2-bis-[4-(2-hydroxyl)] phenyl propane. Polyols are also usable in small amounts, such as glycerene, hexanetriol, pentaerythtriol, sorbitol, trimethylol ethane, trimethylol propane and tris(2-hydroxy) isocyanate. It is also possible to use epox compounds in place of diols or polyols. The proportion of neopentyl glycol and/or propylene glycol in the alcohol component preferably is at least 50 mol % in relation to the total acids.

Suitable semi-crystalline polyesters have an acid number of 10 to 400 (mg KOH/g) and an exactly defined DSC melting point. The semi-crystalline polyesters are condensation products from aliphatic polyols, preferably aliphatic diols, and aliphatic and/or cycloaliphatic and/or aromatic polybasic carboxylic acids, preferably dibasic acids. Examples of aliphatic polyols are: ethylene glycol (1,2-ethane diol), propylene glycol (1,3-propane diol), butylene glycol (1,4-butane diol), 1,6-hexane diol, neopentyl glycol, cyclohexane dimethanol, trimethylol propane, etc. Aliphatic diols are preferred, such as ethylene glycol, butylene glycol and 1,6-hexane diol.

Suitable polybasic carboxylic acids are aliphatic dicarboxylic acids, preferably $C_4$-$C_{20}$-dicarboxylic acids, such as adipic acid, azelaic acid, sebacic acid, dodecane dicarboxylic acid, succinic acid, undecane dicarboxylic acid, and aromatic dicarboxylic acids, such as terephthalic acid, isophthalic acid, phthalic acid and their hydration products, such as 1,4-cyclohexane dicarboxylic acid. Aliphatic dicarboxylic acids with 6 to 12 carbon atoms are preferred. It is of course also possible to employ mixtures of various polyols and polybasic carboxylic acids.

Suitable carboxyl-functional acrylate polymers have an acid value number of 10 to 300 (mg KOH/g), produced by copolymerization of a mixture of monomers, consisting of a) 0 to 70 parts by weight of methyl(meth)acrylate, b) 0 to 60 parts by weight of (cyclo)alkyl esters of acrylic and/or methacrylic acids with 2 to 18 carbon atoms in the alkyl or cycloalkyl radical, c) 0 to 90 parts by weight of vinyl aromatics, d) 0 to 60 parts by weight of olefinically unsaturated carboxylic acid, wherein the sum of the parts by weight of the components a) to d) is 100.

The monomers b) are preferably (cyclo)alkyl esters of acrylic or methacrylic acid with 2 to 18 carbon atoms in the (cyclo)alkyl radical. Examples of suitable or preferably suitable monomers b) are ethyl(methyl)acrylate, n-propyl (meth)acrylate, isopropyl(meth)acrylate, n-butyl(meth)acrylate, isobutyl(meth)acrylate, tert.-butyl(meth)acrylate, 2-ethylhexyl(meth)acrylate, cyclohexyl- methacrylate, neopentyl methacrylate, isobornyl-methacrylate, 3,3,5-trimethyl cyclohexyl methacrylate and stearyl methacrylate.

Styrene, vinyl toluene and a-ethyl styrene, for example, can be considered as monomers c). Examples of d) are acrylic and methacrylic acids, which are also preferably employed, as well as crotonic acid, itaconic acid, fumaric acid, maleic acid and citraconic acid.

Production of the copolymers can take place by copolymerization of the monomers a) to d) cited by way of example in accordance with customary radical polymerization processes, such as solvent, emulsion, bead or substance polymerization.

In this case the monomers are copolymerized at temperatures between 60° to 160° C., preferably 80° to 150° C., in the presence of radical-forming agents and possibly molecular weight regulators.

Production of the carboxyl-functional acrylate copolymers takes place in inert solvents. Suitable solvents are, for example, aromatics, such as benzene, toluene, xylene; esters, such as ethyl acetate, butyl acetate, hexyl acetate, heptyl acetate, methylglycol acetate, ethylglycol acetate, methoxypropyl acetate; ethers, such as tetrahydro-furane, dioxane, diethylene glycoldimethyl ether; ketones, such as acetone, methylethyl ketone, methylisobutyl ketone, methyl-n-amyl ketone, methylisoamyl ketone or arbitrary mixtures of such solvents.

The preparation of the copolymers can take place continuously or discontinuously. Customarily the monomer mixture and the initiator are evenly and continuously metered into a polymerizing reactor and the corresponding amount of polymer is simultaneously continuously removed. It is possible to produce copolymers which are preferably chemically almost uniform. It is also possible to produce chemically almost uniform copolymers by letting the reaction mixture run into a stirring vessel at a constant speed without removing the polymer.

It is also possible to introduce a part of the monomers into solvents of the type mentioned above, for example, and to place the remaining monomers and auxiliary agents separately or together into this material at the reaction temperature.

Polymerization generally takes place under atmospheric pressure, but it can also be performed under pressures up to 25 bar. The initiators are employed in amounts between 0.05 to 15 weight-%, relating to the total amount of monomers.

Usual radical starters are suitable initiators, for example aliphatic azo compounds, such as azodiisobutyric nitrile, azo-bis-2-methylvalero nitrile, 1,1'-azo-bis-1-cyclohexane nitrile and 2,2'-azo-bis-isobutyric alkyl ester; symmetrical diacyl peroxides, such as acetyl, propionyl or butyril peroxide, benzoyl peroxides substituted with bromo-, nitro-, methyl- or methoxy groups, lauryl peroxides; symmetrical peroxidicarbonates, for example tert. butyl-perbenzoate; hydroperoxides, such as tert. butyl hydroperoxide, cumene hydroperoxide; dialkyl peroxides, such as dicumyl peroxide, tert. butylcumyl peroxide or di-tert. butyl peroxide. Conventional regulators can be employed during processing to regulate the molecular weight of the copolymers. Cited as examples are mercaptopropionic acid, tert. dodecyl mercaptan, n-dodecyl mercaptan or diisopropyl xanthogenic disulfide. The regulators can be added in amounts between 0.1 to 10 weight-%, relating to the total amount of monomers.

The solutions of copolymers occurring during copolymerization can then be supplied without further processing to the evaporation or venting process, wherein the solvent is removed, for example in an evaporation extruder or spray dryer at approximately 120° to 160° C. and in a vacuum of 100 to 300 mbar, and the copolymers to be used in accordance with the invention are obtained.

Mixtures of several curing agents can also be used in the thermosetting powder coating systems.

The amounts of anhydrides and acids used as the curing agent—component (B)—in relation to the acrylic resin, can vary over a wide range and depend on the number of epoxide groups in the acrylate resin. Generally a mol ratio of carboxyl groups or anhydride groups to epoxide groups of 0.4 to 1.4:1, preferably of 0.8 to 1.2:1, is selected.

The pigments and/or fillers and/or additives usual for producing and using powder coatings can be present in the coating system in accordance with the invention.

These are additives from the group of accelerators, flow control and degassing agents, heat, UV and/or HALS (*hindered amine light stabilizer*) stabilizers and/or tribo-additives, as well as matting agents, such as waxes, if required.

Production of the powder for coatings in accordance with the invention preferably takes place in the molten mass by mutual extrusion of all formulation components at temperatures of 60° to 140° C. The extrudate is subsequently cooled, comminuted and screened to a grain size of less than 90 mm. Other methods are basically also suitable for producing the powder for coatings, for example mixing of the formulation components in solution and subsequent precipitation or removal of the solvents by distillation.

The application of the powder to form coatings in accordance with the invention takes place by means of processes usual for coatings from powder, for example by means of electrostatic spraying devices (corona or tribo) or in accordance with the fluidized bed method.

The production and properties of the thermosetting powder coating materials in accordance with the invention will be represented by way of examples below.

Production of Hydroxyl-Functional Copolyesters

Examples 1 to 4

EXAMPLE 1

501.8 g (4.82 mol) of neopentyl glycol are placed into a 2-esterification reactor, equipped with a temperature sensor, stirrer, reflux column and distillation bridge, and are melted at 140° C. in a nitrogen atmosphere, which is maintained during the entire reaction. Then 533.3 g (3.21 mol) of isophthalic acid, 138.2 g (0.80 mol) of cyclohexane dicarboxylic acid and 0.6 g of esterification catalyst are added while stirring. After a stepped increase of the interior temperature, the reaction is continued until no more distillate is generated. Condensation is performed in a vacuum of 20 mbar until a melt viscosity of approximately 50 Pa.s at 160° C. is attained.

The polyester obtained has an acid value number of <2 mg KOH/g, a hydroxyl number of 35 mg KOH/g, and an ICI melt viscosity at 160° C. of 45 Pa.s.

The molecular weight, calculated as the average number from the end group concentration, is approximately 2800.

EXAMPLE 2

In a test apparatus analogous to Example 1, 501.8 g (4.82 mol) of neopentyl glycol are provided and melted at 140° C. in a nitrogen atmosphere maintained during the entire reaction. Then 533.3 g (3.21 mol) of isophthalic acid, 138.2 g (0.80 mol) of cyclohexane dicarboxylic acid and 0.6 g of esterification catalyst are then added while stirring. After a stepped increase of the interior temperature the reaction is continued until no more distillate is generated. Condensation is performed in a vacuum of 20 mbar until a melt viscosity of approximately 15 Pa.s at 160° C. is attained. The polyester obtained has an acid value number of <2 mg KOH/g, a hydroxyl number of 60 mg KOH/g, and an ICI melt viscosity at 160° C. of 14 Pa.s.

The molecular weight, calculated as the average number from the end group concentration, is approximately 1700.

EXAMPLE 3

In a test apparatus analogous to Example 1, 492.0 g (4.72 mol) of neopentyl glycol, 17.5 g (0.28 mol) of ethylene glycol and 5.4 g (0.04 mol) of trimethylol propane are provided and melted at 140° C. in a nitrogen atmosphere maintained during the entire reaction. Then 496.1 g (2.99 mol) of terephthalic acid, 134.1 g (0.81 mol) of isophthalic acid, 29.5 g (0.20 mol) of adipic acid, 7.7 g (0.04 mol) of trimellitic acid anhydride and 0.6 g of esterification catalyst are then added while stirring. After a stepped increase of the interior temperature the reaction is continued until no more distillate is generated. Condensation is performed in a vacuum of 20 mbar until a melt viscosity of approximately 10 Pa s at 160° C. is attained.

The polyester obtained has an acid value number of <2 mg KOH/g, a hydroxyl number of 100 mg KOH/g, and an ICI melt viscosity at 160° C. of 8 Pa.s.

The molecular weight, calculated as the average number from the end group concentration, is approximately 1100.

EXAMPLE 4

In a test apparatus analogous to Example 1, 533.1 g (4.51 mol) of hexane diol and melted at 140° C. in a nitrogen atmosphere maintained during the entire reaction. Then 629.3 g (2.73 mol) of dodecane dioic acid and 0.6 g of esterification catalyst are then added while stirring. After a stepped increase of the interior temperature the reaction is continued until no more distillate is generated.

The polyester obtained has an acid value number of <2 mg KOH/g, a hydroxyl number of 199 mg KOH/g, and an ICI melt viscosity at 160° C. of 2 Pa.s.

The molecular weight, calculated as the average number from the end group concentration, is approximately 550.

TABLE 1

| Properties; Examples 1 to 4 | | | | |
|---|---|---|---|---|
| | Example 1 | Example 2 | Example 3 | Example 4 |
| Resin No. | I | II | III | IV |
| OH-No. [mg KOH/g] | 33 | 60 | 100 | 200 |
| Molekular weight (Mn) | 2800 | 1700 | 1100 | 550 |

Production of the Epoxide Group-Containing Copolyesters

Examples 5 to 12

EXAMPLE 5

In a heatable 20 liter reactor, provided with a thermometer, stirrer and reflux column, 1697 g of resin no. I are dissolved in 6500 g of toluene. After adding 16 ml of boron (III) fluoride ethyletherate, the temperature is increased to 80° C. and 100 g epichlorohydrin are added in drops over 1 hour. Subsequently the material is further stirred for 30 minutes at 80° C. and then cooled to 50° C. After the addition of 200 g of an aqueous sodium hydroxide solution (22%), stirring is performed for a further hour at 50° C. Following this the aqueous phase is separated. After vacuum distillation of the organic phase at a temperature of 130° C. at reduced pressure (1 mm Hg), resin no. V is obtained (see Table 2 for properties).

EXAMPLE 6

In a heatable 20 liter reactor, provided with a thermometer, stirrer and reflux column, 934 g of resin no. II are dissolved in 3000 g of toluene. After adding 10 ml of boron (III) fluoride ethyletherate, the temperature is increased to 80° C. and 100 g epichlorohydrin are added in drops over 1 hour. Subsequently the material is further stirred for 30 minutes at 80° C. and then cooled to 50° C. After the addition of 200 g of an aqueous sodium hydroxide solution (22%), stirring is performed for a further hour at 50° C. Following this the aqueous phase is separated. After vacuum distillation of the organic phase at a temperature of 130° C. at reduced pressure (1 mm Hg), resin no. VI is obtained (see Table 2 for properties).

EXAMPLE 7

In a heatable 20 liter reactor, provided with a thermometer, stirrer and reflux column, 560 g of resin no. III are dissolved in 2000 g of toluene. After adding 16 ml of boron (III) fluoride ethyletherate, the temperature is increased to 80° C. and 100 g epichlorohydrin are added in drops over 1 hour. Subsequently the material is further stirred for 30 minutes at 80° C. and then cooled to 50° C. After the addition of 200 g of an aqueous sodium hydroxide solution (22%), stirring is performed for a further hour at 50° C. Following this the aqueous phase is separated. After vacuum distillation of the organic phase at a temperature of 130° C. at reduced pressure (1 mm Hg), resin no. VII is obtained (see Table 2 for properties).

EXAMPLE 8

In a heatable 20 liter reactor, provided with a thermometer, stirrer and reflux column, 280 g of resin no. IV are dissolved in 1000 g of toluene. After adding 3 ml of boron (III) fluoride ethyletherate, the temperature is increased to 80° C. and 100 g epichlorohydrin are added in drops over 1 hour. Subsequently the material is further stirred for 30 minutes at 80° C. and then cooled to 50° C. After the addition of 200 g of an aqueous sodium hydroxide solution (22%), stirring is performed for a further hour at 50° C. Following this the aqueous phase is separated. After vacuum distillation of the organic phase at a temperature of 130° C. at reduced pressure (1 mm Hg), resin no. VIII is obtained (see Table 2 for properties).

EXAMPLE 9

In a heatable 20 liter reactor, provided with a thermometer, stirrer and reflux column, 1697 g of resin no. I are dissolved in 6500 g of toluene and 1000 g of epichlorohydrin at 60° C. After adding 18.6 g of benzyl-trimethyl ammonium chloride, 200 g of an aqueous sodium hydroxide solution (22%) are added and stirring is performed for an hour at 60° C. Then the aqueous phase is separated. After vacuum distillation of the organic phase at a temperature of 130° C. at reduced pressure (1 mm Hg), resin no. IX is obtained (see Table 2 for properties)

EXAMPLE 10

In a heatable 20 liter reactor, provided with a thermometer, stirrer and reflux column, 934 g of resin no. II are dissolved in 3000 g of toluene and 1000 g of epichlorohydrin at 60° C. After adding 18.6 g of benzyl-trimethyl ammonium chloride, 200 g of an aqueous sodium hydroxide solution (22%) are added and stirring is performed for an hour at 60° C. Then the aqueous phase is separated. After vacuum distillation of the organic phase at a temperature of 130° C. at reduced pressure (1 mm Hg), resin no. X is obtained (see Table 2 for properties).

EXAMPLE 11

In a heatable 20 liter reactor, provided with a thermometer, stirrer and reflux column, 560 g of resin no. I are dissolved in 2000 g of toluene and 1000 g of epichlorohydrin at 60° C. After adding 18.6 g of benzyl-trimethyl ammonium chloride, 200 g of an aqueous sodium hydroxide solution (22%) are added and stirring is performed for an hour at 60° C. Then the aqueous phase is separated. After vacuum distillation of the organic phase at a temperature of 130° C. at reduced pressure (1 mm Hg), resin no. XI is obtained (see Table 2 for properties).

EXAMPLE 12

In a heatable 20 liter reactor, provided with a thermometer, stirrer and reflux column, 280 g of resin no. I are dissolved in 1000 g of toluene and 1000 g of epichlorohydrin at 60° C. After adding 18.6 g of benzyl-trimethyl ammonium chloride, 200 g of an aqueous sodium hydroxide solution (22%) are added and stirring is performed for an hour at 60° C. Then the aqueous phase is separated. After vacuum distillation of the organic phase at a temperature of 130° C. at reduced pressure (1 mm Hg), resin no. XII is obtained (see Table 2 for properties).

TABLE 2

Properties, Examples 5 to 12

| | Example 5 | Example 6 | Example 7 | Example 8 |
|---|---|---|---|---|
| Resin No. | V | VI | VII | VIII |
| Starting Resin | I | II | III | IV |
| E-No. [Equiv./100 g] | 0,054 | 0,095 | 0,150 | 0,280 |
| Molecular weigth (Mn) | 2800 | 1700 | 1100 | 550 |

| | Example 9 | Example 10 | Example 11 | Example 12 |
|---|---|---|---|---|
| Resin No. | IX | X | XI | XII |
| Starting Resin | I | II | III | IV |
| E-No. [Equiv./100 g] | 0,052 | 0,097 | 0,149 | 0,281 |
| Molecular weigth (Mn) | 2800 | 1700 | 1100 | 550 |

Production of the Powder Coating Materials

Examples 13 to 22

General Working Formula

The components (see Table 3) are mixed in a Henschel mixer at 700 rpm for 30 sec and subsequently are extruded from a Buss co-kneader (PLK 46) at a barrel temperature of 100° C., cooled screw and screw rotation of 150 rpm. The extrudate is cooled, milled and screened to less than 90 μm.

The powder coatings are electrostatically (corona or tribo) applied as coatings to aluminum sheets (Q-panel AL 36 5005 H 14/08 (0.8 mm)) and the coatings are cured at a curing temperature of 200° C. and a baking time of 15 min. The film thickness is 60 μm.

TABLE 3

Powder Coating Formulations (in weight-%)

| COMPONENTS | Example 13 | Example 14 | Example 15 | Example 16 | Example 17 |
|---|---|---|---|---|---|
| Grilesta P7312* | 25 | 30 | 35 | 40 | 34 |
| Resin No. V | 25 | | | | |
| Resin No VI | | 20 | | | 12 |
| Resin No. VII | | | 15 | | |
| Resin No. VIII | | | | 10 | 4 |
| TiO₂ KRONOS 2160 | 40 | 40 | 40 | 40 | 40 |
| PV88[1) | 7 | 7 | 7 | 7 | 7 |
| Benzoin | 3 | 3 | 3 | 3 | 3 |

| COMPONENTS | Example 18 | Example 19 | Example 20 | Example 21 | Example 22 |
|---|---|---|---|---|---|
| Grilesta P7312* | 25 | 30 | 35 | 40 | 34 |
| Resin No. V | 25 | | | | |
| Resin No. VI | | 20 | | | 12 |
| Resin No. VII | | | 15 | | |
| Resin No. VIII | | | | 10 | 4 |
| TiO₂ KRONOS 2160 | 40 | 40 | 40 | 40 | 40 |
| PV88[1) | 7 | 7 | 7 | 7 | 7 |
| Benzoin | 3 | 3 | 3 | 3 | 3 |

[1)Flow-control agent on polyacrylate basis, a commercial product of Worleè-Chemie GmbH
*Grilesta P7312: Carboxyl-functional Copolyester Acid No.: 33 [mgKOH/g] EMS-CHEMIE AG

TABLE 4 shows the technical coating properties of Examples 13 to 22.

|  | Example 13 | Example 14 | Example 15 | Example 16 | Example 17 |
|---|---|---|---|---|---|
| Glass (60° DIN 67530) | 91 | 92 | 91 | 90 | 90 |
| Flow | very good | very good | very good | very good | very good |
| Erichsen Penetration (DIN 53156) [mm] | 10 | 10 | 10 | 10 | 10 |
| Stress cutting (DIN 52151) | 0 | 0 | 0 | 0 | 0 |
| Impact (ASTM D 2794, reverse) | >160 | >160 | >160 | >160 | >160 |
|  | Example 18 | Example 19 | Example 20 | Example 21 | Example 22 |
| Glass (60° DIN 67530) | 91 | 91 | 90 | 90 | 91 |
| Flow | very good | very good | very good | very good | very good |
| Erichsen Penetration (DIN 53156) [mm] | 10 | 10 | 10 | 10 | 10 |
| Press cutting (DIN 52151) | 0 | 0 | 0 | 0 | 0 |
| Impact (ASTM D 2794, reverse) | >160 | >160 | >160 | >160 | >160 |

We claim:

1. A method for producing glycidic ether-containing amorphous or semi-crystalline copolyesters, characterized in that in a first step a hydroxyl-functional amorphous or semi-crystalline copolyester is produced and subsequently in a second step is converted with an epihaloalkane to form a glycidic ether-containing copolyester.

2. A method for producing glycidic either-containing copolyesters in accordance with claim 1, characterized in that the epihaloalkane is selected from the group consisting of 1-chloro-2,3-epoxy propane (epichlorohydrin), 1-chloro-2-methyl-2,3-epoxy propane, 1-chloro-2,3-epoxy butane and epibromohydrin.

3. A method in accordance with claim 1, characterized in that the conversion is performed in two stages wherein first the attachment of epihaloalkanes to the hydroxyl group is carried out in the presence of a Lewis acid and subsequently the dehydrohalogenation of the polyhalohydrin is carried out with lye.

4. A method for producing glycidic ether-containing copolyesters, characterized in that a copolyester is converted with an epihaloalkane in a single stage in accordance with a phase transfer mechanism in the presence of a quaternary onium salt to form a glycidic ether-containing copolyester.

5. A method in accordance with claim 4, characterized in that, the onium salts are ammonium salts or phosphonium salts, selected from the group consisting of benzyltrimetyl-ammonium-bromide, tetramethyl ammonium bromide, benzyl trimethyl ammonium chloride, ethyl-triphenyl-phosphonium bromide and butyl triphenyl phosphonium chloride.

6. A method according to claim 4 wherein said epihaloalkane is epichlorohydrin.

7. A glycidic ether-containing copolyester, produced by the method of claim 1.

8. A glycidic ether-containing copolyester, produced by the method of claim 2.

9. A glycidic ether-containing copolyester, produced by the method of claim 3.

10. A glycidic ether-containing copolyester, produced by the method of claim 4.

11. A glycidic ether-containing copolyester, produced by the method of claim 5.

12. A glycidic ether-containing amorphous or semi-crystalline copolyester having a molecular weight (Mn) of 300 to 10,000 and having an epoxide number of 0.018 to 0.510.

13. A glycidic ether-containing amorphous copolyester according to claim 12 containing components selected from the group consisting of terephthalic acid, isophthalic acid, adipic acid, trimellitic acid and anhydride, neopentyl glycol, ethylene glycol and trimethylol propane.

14. An amorphous glycidic ether-containing copolyester according to claim 12 containing up to 95 mol % of cyclohexane dicarboxylic acid, up to 95 mol % of isophthalic acid, and neopentyl glycol.

15. A semi-crystalline glycidic ether-containing copolyester according to claim 12 containing dodecane dicarboxylic acid and hexane diol.

* * * * *